US005679191A

United States Patent [19]

Robinson

[11] Patent Number: 5,679,191

[45] Date of Patent: Oct. 21, 1997

[54] METHOD OF FABRICATING TRAILER LENGTH PLATFORM TRUCK FLOORING

[76] Inventor: T. Lee Robinson, 1 Hardwood La., Mobile, Ala. 36671

[21] Appl. No.: 504,520

[22] Filed: Jul. 20, 1995

[51] Int. Cl.[6] .................... B32B 31/00

[52] U.S. Cl. .................... 156/64; 156/256; 156/257; 156/304.1; 156/304.5; 156/378; 73/150 A; 144/351; 144/356

[58] Field of Search .................... 156/64, 304.1, 156/304.5, 378, 256, 257; 144/346, 350, 351, 356; 73/150 A, 788, 794, 812

[56] References Cited

U.S. PATENT DOCUMENTS

| | | | |
|---|---|---|---|
| 3,602,275 | 8/1971 | Nissen | 144/3 R |
| 3,844,320 | 10/1974 | Dimter | 144/3 R |
| 3,927,705 | 12/1975 | Cromeens | 144/317 |
| 3,985,169 | 10/1976 | Chow | 144/317 |
| 4,095,634 | 6/1978 | Berglund . | |
| 4,128,119 | 12/1978 | Maier . | |
| 4,289,037 | 9/1981 | Vinopal | 73/812 X |
| 4,321,834 | 3/1982 | Oliver | 73/812 |
| 4,356,045 | 10/1982 | Elford et al. | 156/64 |
| 4,797,169 | 1/1989 | Aizawa et al. | 156/64 |
| 4,931,113 | 6/1990 | Feichtmeir et al. | 156/64 |
| 4,934,228 | 6/1990 | Bolton et al. | 156/64 X |
| 4,938,265 | 7/1990 | Mountz . | |
| 4,941,521 | 7/1990 | Redekop . | |
| 4,943,328 | 7/1990 | Quick | 156/64 |
| 4,989,651 | 2/1991 | Snellgrove | 144/3 R |
| 5,137,066 | 8/1992 | Dimter . | |

*Primary Examiner*—David A. Simmons
*Assistant Examiner*—Paul M. Rivard
*Attorney, Agent, or Firm*—Isaf, Vaughan & Kerr

[57] ABSTRACT

An improved method for fabricating trailer length platform flooring from wooden blanks comprises selecting kiln dried lumber having a predetermined width and thickness and exhibiting preestablished strength and durability characteristics. The lumber is inspected for the presence of unacceptable defects and the defects are cut out to form defect-free blanks of varying lengths. The blanks are aligned successively in spaced end to end relationship with the trailing end of one blank facing the leading end of the next successive blank. The facing ends are then machined with interlockable vertically extending fingers, adhesive is applied to at least one of the ends, and the fingers are pressed together with a predetermined pressure to bond the ends of the blanks together. These steps are repeated resulting in a continuously growing composite plank comprised of end-to-end joined blanks. When the composite plank has reached a predetermined length, it is cut to a prescribed length, cured, proof loaded to test its strength, milled to a predetermined exterior configuration, and bundled in kits for flooring platform trailers. The resulting trailer length finger jointed trailer flooring planks are far superior to flooring of the prior art.

19 Claims, 3 Drawing Sheets

METHOD OF FABRICATING TRAILER LENGTH PLATFORM TRUCK FLOORING

TECHNICAL FIELD

This invention relates generally to platform truck trailers. More specifically, the invention relates to an improved method of fabricating wooden floor boards that extend the full length of a platform trailer and that are attached to the frame of the trailer to define the floor or deck of the trailer.

BACKGROUND OF THE INVENTION

Platform truck trailers, sometimes called flat bed trailers, have long been used in this country to haul cargo from one place to another. In general, such trailers comprise a wheeled frame having a pair of longitudinally extending I-beams with an array of transversely extending metal sills or junior I beams extending across the tops of the main beams. These junior I beams typically have approximately a 2" wide flange that provides the space atop which planks are fastened. To form the deck or floor of the trailer, a plurality of wood floor boards typically are attached with screws to the sills with the floor boards extending along the length of the trailer from the front to the rear thereof. These floor boards, then, form the solid deck of the trailer that receives and supports the cargo loaded thereon.

Throughout the years, various methods and materials have been used in the flooring of platform truck trailers. One common method is to floor the trailer with a large number of wooden boards arrayed end to end and side by side to cover the deck of the trailer. In this method, the many boards required must each be cut to a precise length to ensure that butt ends of aligned boards fall on a metal sill of the trailer. This is because the butt ends of the boards as well as their intermediate portions must be attached to the underlying trailer sills by means of screws. In addition, the boards at the front and rear of the trailer must also be carefully sized so that their ends fall precisely at the front of the trailer or the rear of the trailer respectively. These ends, like the interior butt ends of the boards, are also attached to the trailer frame by means of screws.

The just described common method of flooring a platform trailer has been widely used for many years. Nevertheless, this flooring method is fraught with numerous problems and shortcomings inherent in its components and methodology. For example, a typical platform trailer floored in this manner will require sixty to seventy separate boards, each of which must be carefully sized to fit together with the other boards in creating the deck of the trailer. Obviously, this entails a significant investment of time and resources in sizing, cutting, and otherwise machining all of the required boards.

An even more acute problem arises in butt end flooring from the inherent requirement that approximately 120–140 board ends occur at random positions all along the length of the trailer. Each of these ends must be attached to an underlining sill with screws that are inserted through the boards within one-half inch of their ends. This has the unavoidable effect of causing the boards to split at their ends at the positions where the screws are inserted through the boards. In fact, many such splits occur even on brand new trailers as they leave the production line. As the trailers begin to age, the splits become more prominent and it is not uncommon for the board ends simply to pull completely away from the screws that hold the boards to the sills. When this happens the board ends raise up and can catch cargo or be broken off as cargo is slid on and off the trailer.

An additional problem with the numerous butt ends of common trailer flooring occurs because, on platform trailers, the boards are almost always exposed to the elements. The exposed ends of the boards therefore tend to absorb water and begin to rot or otherwise lose their structural integrity very quickly. This can be another reason that the butt ends of the boards separate from their screws, raise up, and catch cargo. A further problem with the butt end method of flooring platform trailers is that the large number of boards that are arranged end to end along the length of the trailer contribute almost nothing to the overall strength and rigidity of the trailer itself. This is because the individual short boards are free to move relative to one another as the trailer flexes up and down during use.

Laminated wooden flooring is very commonly used in enclosed van type trailers. Laminated flooring consists of large numbers of relative small narrow strips of wood glued together longitudinally side by side in laminated fashion to form a composite wider floor plank. When installed in a trailer, the individual strips and the glue lines therebetween extend longitudinally from the front to the rear of the trailer. Individual wooden strips in the laminated plank typically are joined together at their ends with hook joints that aid in the manufacturing process and provide an impervious joint so that water and road splash does not penetrate up through the bottom of the deck of the trailer into the interior thereof. These types of laminated floors have proved successful in covered van type trailers. This is due in part to the fact that these trailers are covered and the laminated floor planks are not exposed to the elements as on platform trailers. Furthermore, because the sides of these van trailers form a gigantic I-beam, the trailers are very rigid and do not tend to flex or bend from front to back under heavy loads or during use. Thus, the longitudinally or edgeways laminated glue lines tend to maintain their integrity when laminated floor planks are used to deck van type trailers.

Laminated flooring such as that used in van type trailers has been tried in platform trailers without success. It has been found, for example, that the composite laminated planks, when attached to a platform trailer, will delaminate relatively quickly because of the inherent flexing of the platform trailer during use and under loads. In addition, there exists in such laminated floor planks thousands of feet of longitudinally extending glue line, each foot of which is subject to deterioration by the elements, flexing of the trailer, and otherwise. As a result, laminated trailer flooring has not proven to be an acceptable alternative for use in flooring platform truck trailers.

Some platform trailer manufacturers have floored their trailers with aluminum flooring. While this tends to solve some of the weathering problems found with wooden flooring, it nevertheless carries its own set of problems and shortcomings. For example, the aluminum extrusions tend to become fatigued over time with the constant flexing and bending of the trailer during use. In addition, aluminum flooring does not provide some of the unique advantages of wooden flooring, including the ability to nail or otherwise lash cargo directly to the flooring.

It is highly desirable to deck platform trailers with trailer length wooden floor boards, each of which extends continuously from the front of the trailer to the rear of the trailer. Since platform trailers typically are of lengths up to 52.5 feet long, continuous single planks of appropriate length are not possible. Accordingly, trailer length floor planks must be fabricated by joining shorter wooden blanks together at their ends to produce composite planks of extended length sufficient to extend the entire length of a trailer. U.S. Pat. No. 4,938,265 describes a method of making a truck floor that involves end to end finger jointing of shorter pieces of laminated flooring together to form longer trailer length planks. This is a floor for enclosed bodies and is a recovery product that is not in use. This patent discloses the formation at the ends of the shorter timbers of a finger joint that extends parallel to the widths of the boards. The patent emphasizes the importance of such a finger joint in creating a visually attractive one line joint between successive boards. In fact, the '265 patent teaches away from transverse finger joints where the fingers extend parallel to the thickness of the timbers forming the board because, it is alleged, such joints are unsightly and undesirable.

While the method of fabricating flooring as shown in the '265 patent might be useful for flooring van type trailers or truck bodies as shown in FIG. 3 of the '265 patent, it nevertheless is not suitable for platform trailers that constantly flex during use. This is because the finger joints joining successive blanks extend parallel to the widths of the resulting trailer length plank in a direction perpendicular to the up and down flexing movement of the trailer. Over time, this flexing in a direction perpendicular to the finger joints degrades the joints and causes them to come apart, particularly should they be exposed to the elements. Also, these joints tend to be relatively weak and sometimes have difficulty withstanding the vertical cargo loading common in platform truck trailers.

Thus, it is seen that there exists a continuing and heretofore unaddressed need for a method of fabricating a wooden platform trailer flooring in which shorter blanks are reliably joined together end to end to form composite floor planks that extend continuously from the front of the trailer to the rear thereof. The method produces a superior trailer length flooring in which the joints between individual blanks forming the planks are strong, reliable, and able to withstand the flexing that continuously occurs during loading and use of platform trailers. In addition, the resulting trailer length floor planks should be precertified in the course of their fabrication to ensure that they meet predetermined strength criteria along their entire lengths. Further, such a method should be performable in a continuous highly efficient operation and should be able to produce consistent high quality floor planks of any desired length independently of the lengths of the individual wood blanks from which the composite planks are fabricated. It is to the provision of such a method and an improved trailer length floor plank resulting from the method that the present invention is primarily directed.

SUMMARY OF THE INVENTION

Briefly described, the present invention, in a preferred embodiment thereof, comprises an improved method of fabricating finger jointed trailer length truck flooring for flooring the deck of platform trailers. In general, the method comprises the steps of selecting lumber having a predetermined width and thickness and exhibiting preestablished strength and durability characteristics. It has been found that domestic Oak or Hickory or imported Keruing lumber that has been ripped to width, surfaced on two sides, and properly kiln dried satisfies the hardness strength and durability requirements of the method. However, other hardwoods might also be selected and this invention is not limited to the use of any particular hardwood. After the species is selected, each of the selected boards is inspected for the presence of unacceptable defects and these defects, when found, are cut out of the board and discarded. This results in virtually defect free lumber blanks of varying lengths with each of the blanks having a leading end and a trailing end.

The blanks are then successively aligned in spaced end-to-end relationship and fed to a finger jointing machine with a trailing end of one blank facing the leading end of the next successive blank. The facing ends of adjacent blanks are machined in the finger jointing machine to form transversely extending mutually interlocking fingers. These fingers or vertical finger joints extend in the direction of board thickness rather than in the direction of board width as with many prior art floor boards. Hence the joint is commonly called a vertical finger joint. The result is a large number of small narrow fingers protruding from the ends of the aligned blanks.

A special water proof glue, a phenol resorcinol glue, is then applied to at least one of the finger jointed ends and the ends are pressed together and clamped with a force in excess of twenty five thousand pounds to interlock and securely adhere the fingers of the aligned blanks together. In this way, the blanks are joined together at their ends to form an extended length composite plank. These steps are repeated with successive blanks, thus progressively producing a composite plank of increasing length. When the composite plank has reached a length at least equal to a predetermined length corresponding to the length of a trailer to be floored, the composite plank is cut off with a cut off saw to the predetermined length.

As successive composite planks are fabricated in this manner, they are progressively stick stacked together in a bundle with spacer sticks positioned between each tier of the stack. The stack is then delivered to a heat chamber where the boards are cured at a predetermined temperature for a predetermined time to set and cure the adhesive used in the finger joints.

When the finger joints in the planks are cured, each plank is independently proof loaded along its length to ensure that the plank meets preestablished strength standards and to test each and every finger joint for integrity. In the proof loading process, each composite plank is moved progressively across support rollers while a predetermined transverse pressure is applied to the moving plank. The deflection imparted to the plank as a result of the application of transverse pressure is constantly measured and a determination is made based on the measured deflection whether or not the composite plank meets a preestablished acceptance criteria. If the plank passes the proof loading test and if none of the finger joints fail, the plank is moved to a matching station where it is milled to a profile required for flooring a trailer. Finally the plank is combined with other planks in a kit to floor a platform trailer.

The method of this invention produces a vertically finger jointed trailer length truck flooring plank that is far superior to prior floor boards. Specifically, each of the planks that results from the method of this invention is a composite trailer length plank. That is, the plank extends completely without a break or a butt end from the front of a trailer to the rear thereof. The transversely extending vertically oriented finger joints with which the individual wood blanks of each plank are joined together are exceptionally strong and, because they extend vertically when installed on the trailer, are virtually unaffected by the natural flexing and bowing of the trailer during loading and use. In addition, the large number of narrow transversely extending fingers creates a total glue area between the wood blanks that is extensive, further contributing to the strength of the finger joints between the blanks. Finally, the method of this invention produces trailer length floor planks in a continuous reliable process that does not require careful measuring and cutting of the component wood blanks, that is independent of the blank lengths, and that results in a trailer length floor plank of precertified strength characteristics that exhibits no butt ends and addresses virtually all of the problems of prior floor boards. These and many other features, objects, and advantages of the invention will become more apparent upon review of the detailed description set forth below taken in conjunction with the accompanying drawings, which are briefly described as follows.

DETAILED DESCRIPTION OF THE PREFERRED EMBODIMENT

Figure 1:
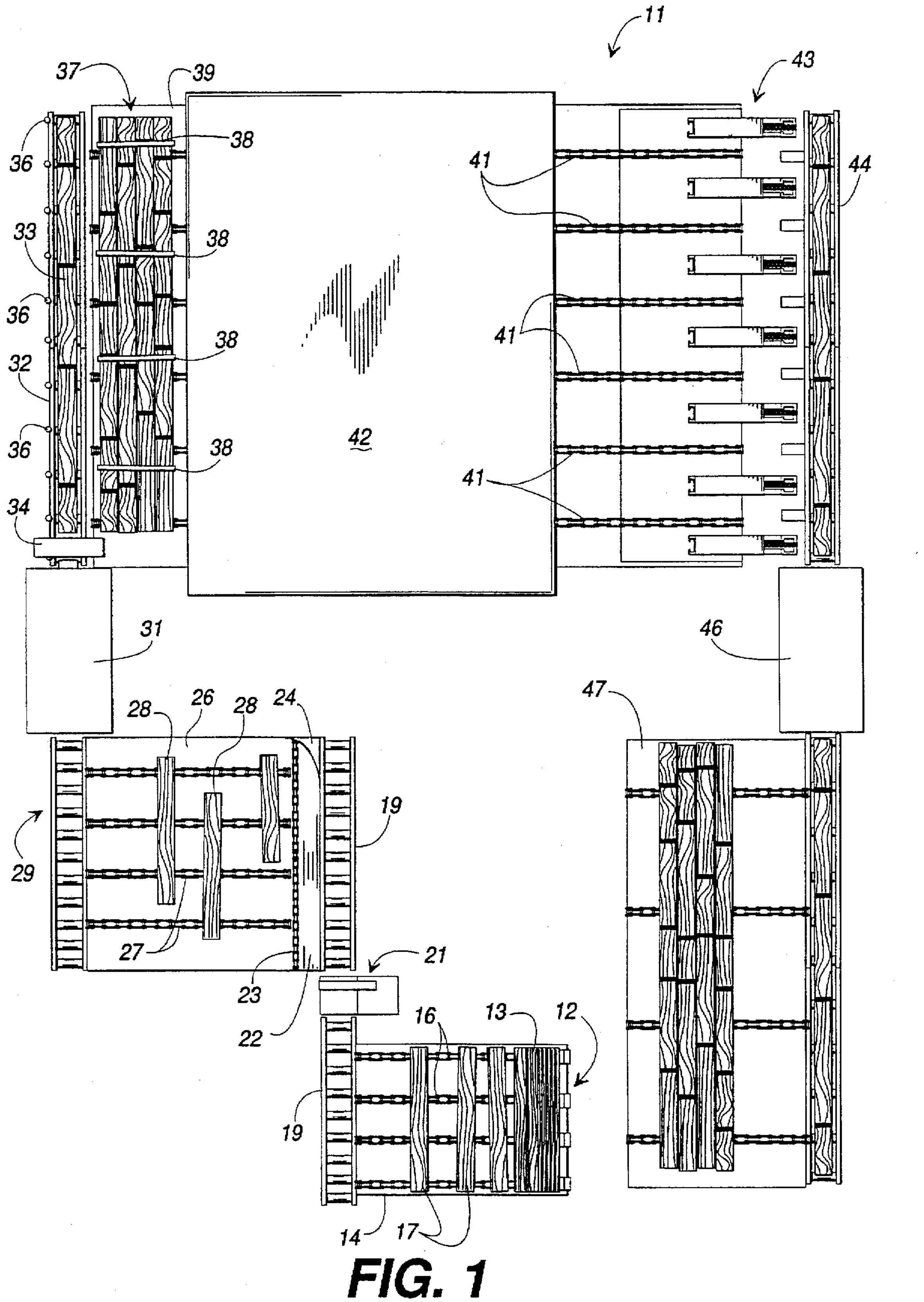
FIG. 1 is a top plan view of a manufacturing line for implementing the method of the present invention in a preferred form.

Referring now in more detail to the drawings, in which like numerals refer to like parts throughout the several views, FIGS. 1–5 illustrate in a preferred embodiment the process of the present invention for fabricating trailer length platform truck flooring and also illustrates the improved flooring itself that results from the process. FIG. 1 illustrates a machinery layout for performing the steps of the present invention. The layout, generally indicated by the numeral 11, comprises a plurality of successive stations wherein the individual steps of the present invention are performed.

A receiving tilt hoist 12 is positioned to receive stacks of kiln dried lumber boards for use in fabricating trailer length platform truck flooring according to the invention. The boards are supplied in stacked bundles 13, which are placed on the tilt hoist 12 by a fork lift truck or other appropriate materials handler. The boards used to manufacture the trailer length platform truck flooring of the present invention can be any suitable domestic or imported hardwood exhibiting the strength and durability characteristics required for supporting loads on a platform trailer. For example, domestic Oak or Hickory are sometimes used. Keruing from South East Asia has primarily been used for about 25 years. Keruing is desirable because of its dense straight grain, lack of knots and other blemishes, and superior strength, durability, and resistance to rot and deterioration.

Once loaded with a bundle of boards, the tilt hoist 12 tilts the bundle back and progressively raises it up so that one course at a time of individual boards from the stack slide onto a conveyer table 14. The conveyer table 14 is provided with conveyer chains 16 that are arranged so that the individual boards 17 rest on the top flight of the chains. When the conveyer chains 16 are activated, their top flights moves to the left in FIG. 1 to deliver the individual boards 17 one at a time to an inspection station 18.

A worker at the inspection station 18 inspects each of the boards 17 as they are delivered to the inspection station 18. If the worker determines upon such inspection that an unacceptable defect such as knot or weak section is present in the board, the unacceptable defect is cut out of the boards. Specifically, the board containing the defect is moved in an upward direction in FIG. 1 along the roller bearing conveyers 19 and across the table of the defect saw 21. At the defect saw 21, a cut is made both ahead of and behind the defect and the cut-out defect portion of the board is discarded. The remaining sections of the board, which are defect free, form wood blanks of various lengths that are slid off of the roller bearing conveyer 19 onto a vertical chain conveyer mechanism 22.

On the conveyer 22, the defect free blanks rest on edge on a chain 23, which moves in an upwardly direction in FIG. 1 to move the blanks in such direction. At the upper end of the vertical chain conveyer 22, the ends of the blanks encounter a curved barrier 24 that functions to flip the blanks off of the vertical conveyer 22 and onto a second conveyer table 26. As with the conveyer table 14, conveyer table 26 is provided with conveyer chains 27 upon the top flight of which the individual defect free blanks 28 come to rest. The conveyer chains 27 can be activated to deliver the blanks 28 to an inspection and infeed station 29.

As the defect free blanks 28 arrive at the inspection and infeed station 29, they can take on a wide variety of lengths ranging from the entire length of the original boards in the stack 13 to much shorter lengths that have resulted from the inspection and defect removal operation. Thus, the defect free blanks generally arrive at the inspection and infeed station 29 having substantially random lengths.

At the inspection and infeed station 29, a worker again inspects the blanks 28 to assure that they have the proper width and thickness and that the blanks are straight. The re-inspected defect free blanks are then fed by the worker in an upward direction in FIG. 1 into the finger jointing and gluing machine 31. The finger jointing machine 31 is manufactured by the Cook Bolinder Limited Company of Great Britain and is designed to finger joint the facing ends of two longitudinally aligned blanks, apply glue to the finger jointed ends, and press the ends together with great force to join the blanks together at their ends.

In passing the blanks 28 through the finger jointing machine 31, a worker successively aligns the defect free blanks in spaced end to end relationship with the trailing end of one blank facing the leading end of a next successive blank. The blanks are fed successively one by one in this manner into the finger jointing machine 31. In the finger jointing machine, appropriate optics and electronics align a leading board and the next successive trailing board with their facing ends spaced apart a predetermined distance. The blanks are then clamped securely in place with hydraulic clamps. A cutting head having pairs of stacked finger jointing cutters moves vertically down and then back up between the spaced ends of the blanks to cut complimenting finger joints in the facing ends of both of the blanks. It will thus be seen that the finger joints are cut to extend vertically and transversely of the blank ends. That is, the fingers and valleys formed by the finger jointing machine extend parallel to the thickness direction of the blanks from the top surface to the bottom surface thereof.

With the finger joints thus cut, an extremely high quality waterproof phenol resorcinol glue is applied to both of the finger jointed ends. The clamping beds within the machine are then moved hydraulically together so that the finger joints of the ends of the blanks are intermeshed, clamped and pressed together with a force in excess of 25,000 pounds. This force functions to set the glue and to join the two blanks together end to end with the finger joints of one end firmly intermeshed with those of the other end. The result is an extended length composite plank formed of the joined together blanks.

When the blanks are pressed and joined together as just described, the clamping beds within the finger jointing machine 31 release the joined ends of the blanks and the composite plank is conveyed upwardly in FIG. 1 out of the finger jointing machine 31 and onto a receiving table 32. The composite plank 33 is moved out of the machine until the trailing end of the last successively joined blank is positioned at the jointing station and the leading end of the next successive blank is also positioned at the jointing station. The jointing, gluing, and pressing steps are then repeated to join the next successive blank to the successively growing composite plank. In this way, the composite plank formed by the joined random length blanks grows progressively as each blank is joined to its end.

Appropriate optical sensors positioned at the distal end of the receiving table 32 determine when the composite plank 33 has reached a length at least equal to a predetermined length for flooring a platform trailer. This length can vary from approximately 22 feet or even much shorter up to a maximum of 52.5 feet depending upon the length of the trailer to be floored. The critical criteria is that the composite plank 33 has a length that will extend completely from the front of a trailer to the rear of a trailer with no butt ends or interruptions in between. The optical sensors are positioned and designed to accommodate any of a variety of trailer length planks.

When it is detected that the progressively growing composite plank 33 has reached at least the predetermined length, a cut off saw 34 is activated to sever the growing ribbon of composite plank 33 to the proper length. The severed trailer length composite plank 33 then rests atop the receiving table 32. At this point, a plurality of sweep arms 36 are pneumatically activated to move to the right in FIG. 1 in unison to push the severed composite plank 33 off of the receiving table 32 and onto a growing stack of severed composite planks 37.

The stack 37 rests on a receiving hoist that is progressively activated by a worker to move down as the stack grows. In addition, specially treated spacer sticks 38 are placed transversely across the stack between each course of planks. The sticks 38 are dipped in a chemical that prevents the glue from adhering to the sticks. In addition, the presence of the sticks provides air space between each course of planks in the stack 37 so that air can circulate freely around and among all of the planks in the stack. This sweep arm delivery and stick stack method of stacking the composite planks provides for a highly efficient operation that is far superior to prior art methods in material handling of stacking boards together.

When the stack 37 is completely formed, the hoist upon which the stack has grown moves downwardly so that the entire stack rests upon a giant chain conveyer table 39. Conveyer chains 41 of the table are then activated to move the stack 37 to the right in FIG. 1 and into a specially constructed heating chamber 42 for curing the stacked composite planks. The stacks 37 are progressively formed and moved in this manner into the heating chamber 42 until the chamber 42 is full or until a predetermined number of composite planks have been fabricated, stick stacked, and moved into the heating chamber.

When the heating chamber 42 is filled, its sides are closed and the stick stacked composite planks therein are subjected to a controlled predetermined temperature for a predetermined time. This curing process completely dries and cures the glue binding the composite planks together at their finger joints. It has been found that, with Keruing for example, curing the planks at a temperature of between about 70 degrees and about 80 degrees and preferably 75° for a period of 12 hours results in complete drying and curing of the glue lines. This method of curing the glue lines has been found to be superior to other somewhat sophisticated methods including subjecting the glue joints to a radio frequency machine that cures the joints with high frequency radio energy. Further, since many stacks of planks can be cured simultaneously, the total throughput of this method can correspond to or exceed that of radio frequency curing. In addition, the curing method of the present invention is far more reliable than a radio frequency curing process in which the radio frequency machine is subject to high maintenance costs.

When the stick stacked composite planks are completely cured within the heating chamber 42, they are transferred to the right in FIG. 1 on conveyer chains 41 to a second tilt hoist 43. The tilt hoist 43 functions in a manner similar to the receiving tilt hoist 12. More specifically, the tilt hoist 43 receives a stack of composite planks that has been cured in the heating chamber 42. The hoist then tilts the stack to the right in FIG. 1 and slowly raises the stack to deposit one plank at a time onto a roller conveyer 44. In this way, each of the composite planks from the stack is delivered one at a time to the roller bearing conveyer 44.

Each plank is then drawn by a rubber feed wheel (not shown) in a downward direction in FIG. 1 into the proof loader mechanism 46. As described in more detail below, the proof loader 46 applies a test load to each of the composite planks virtually along its entire length to ensure that the plank meets preestablished strength standards. The proof loading of the composite planks is an important step in the process since it ensures that completed planks, when installed on a platform truck trailer, will appropriately support loads placed on the trailer without breaking or bending. As the planks move out of the proof loader 46 they are either discarded if they have been found to be unacceptable through the proof loading process or are moved to a receiving conveyer 47 where the completed proof loaded composite planks accumulate. In the proof loading process, a number of weaker solid boards along with the weaker of the finger joints are typically broken which validates the effectiveness of proofloading.

Figure 2:
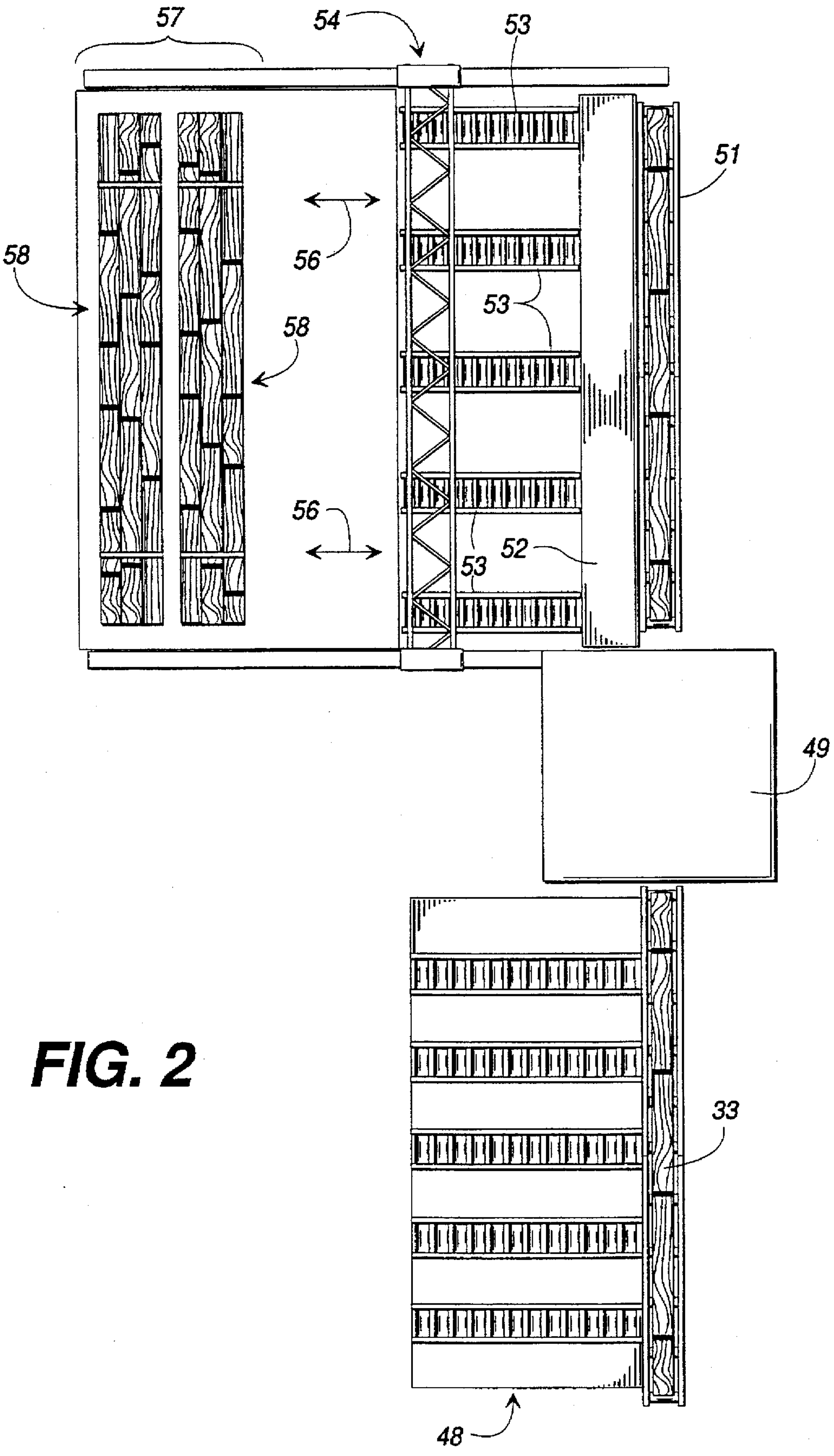
FIG. 2 is a top plan view illustrating the matching, kitting, and stacking process that is performed on the flooring produced by this invention.

From the receiving conveyer 47, the trailer length proof loaded planks are moved with a European style sideloader fork lift truck from the receiving conveyer 47 to the infeed conveyer system 48 of the matcher (FIG. 2). The transportation of the trailer length planks by sideloader lifts is important since these lifts are provided with special 30 foot aprons that support the planks so that they do not flex excessively so as to break at the joints.

From the infeed conveyer mechanism 48, the composite trailer length planks 33 move through a matcher station 49. The matcher station 49 contains a high capacity multi-head planer that machines the top and bottom surfaces of the trailer length planks 33 and also can mill the sides of the board to form a predetermined exterior profile. Such exterior milling profiles vary depending on the design of the trailer floor for which the planks are being made. Typically, however, the tops and bottoms of the planks will be planed flat and smooth while the sides will be milled to create shiplap or rabbit type joint designed to correspond to similar joints on adjacent planks so that, when installed, the planks create a substantially impervious decking on the platform trailer.

From the matcher station 49, the milled trailer length flooring planks move onto a roller bearing conveyer 51 and are then moved laterally by workers down an inclined surface 52. At this point a final inspection of both faces of the planks is made. The top face of each plank is rubber-stamped to identify its position in the trailer. Then the planks move onto the tines 53 of a special overhead bridge crane 54. The bridge crane 54 is moveable back and forth in the direction of arrow 56 to and from an assembly station 57. The bridge crane utilities specially designed forks to handle the trailer length flooring. At the assembly station 57, workers assemble the finished composite trailer length flooring planks into bundled kits 58. At this point, a final inspection is performed and any remaining unacceptable planks are discarded. Each of the kits 58 contains all of the trailer length floor planks necessary to deck a specified platform trailer. Only 12 or 13 planks are needed to floor a trailer vs. the usual 60–70 boards. The flooring planks in a kit 58 are also arranged within the kit so that they can be removed from the kit one at a time in proper order for placement on a platform bed. This greatly simplifies the process of flooring the trailer itself when the kit is delivered to the trailer manufacturer's location.

From the assembly station 57 the kits 58 are moved with sideloader fork lifts to a shipping station (not illustrated) where they are placed aboard trucks and delivered to platform trailer manufacturers or to the owners platform trailers for installation.

Figure 3:
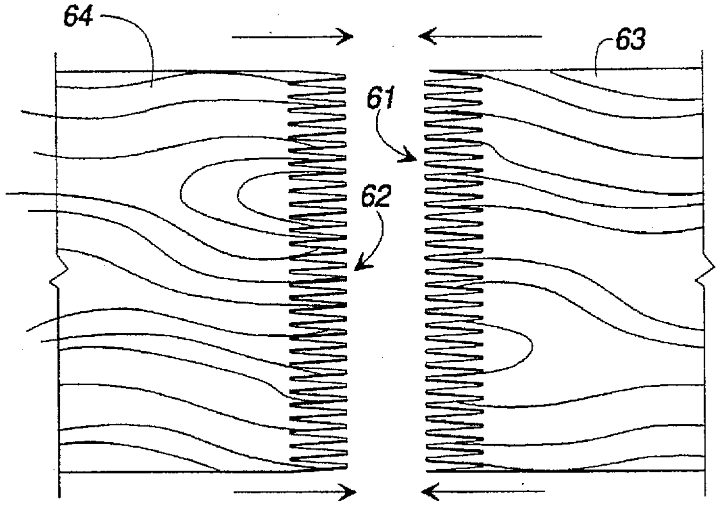
FIGS. 3 and 4 illustrate the transversely extending vertically oriented finger joints with which blanks are joined together end to end to form the composite trailer length floor boards of this invention.
Figure 4:
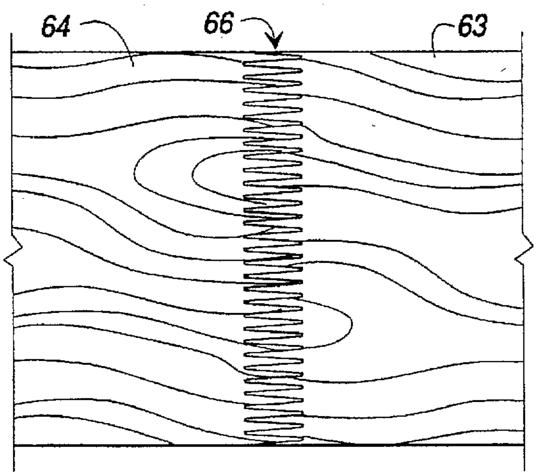

FIGS. 3 and 4 illustrate the finger jointing process through which individual wooden blanks of random length are joined together end to end to form a growing length composite plank that can be cut off to any desired length to form trailer length floor planks. This process, which is performed in the finger jointing machine 31, involves forming a large number of narrow complimenting fingers 61 and 62 on the spaced facing ends of a leading blank 63 and a trailing blank 64 respectively. As mentioned above, the fingers 61 and 62 are formed by a vertically moving cutter head that is provided with stacked cutters adapted to form the fingers in the ends of the blanks. Further, it will be seen that the fingers extend vertically and transversely with respect to the blanks. That is, the hills and valleys of the fingers extend in a direction parallel to the board thickness rather than in a direction parallel to the blank width as described in the prior art. This configuration provides a resulting finger joint that is extremely strong because the large number of fingers create a total gluing surface between the two blanks that is many tens of times greater than the surface of the ends of the blanks themselves. In addition, the fingers being thin and pointed without blunt ends mesh tightly with each other so that each finger becomes somewhat compressed between two fingers of the joined board to ensure a tight and secure bond between the two boards. Finally, the application of a high quality water proof phenol resorcinol glue in conjunction with the pressing together and clamping of the finger jointed ends with a pressure in excess of twenty five thousand pounds creates a finger joint 66 that joins the boards 63 and 64 together with a joint that is virtually as strong as the wood itself.

Figure 5:
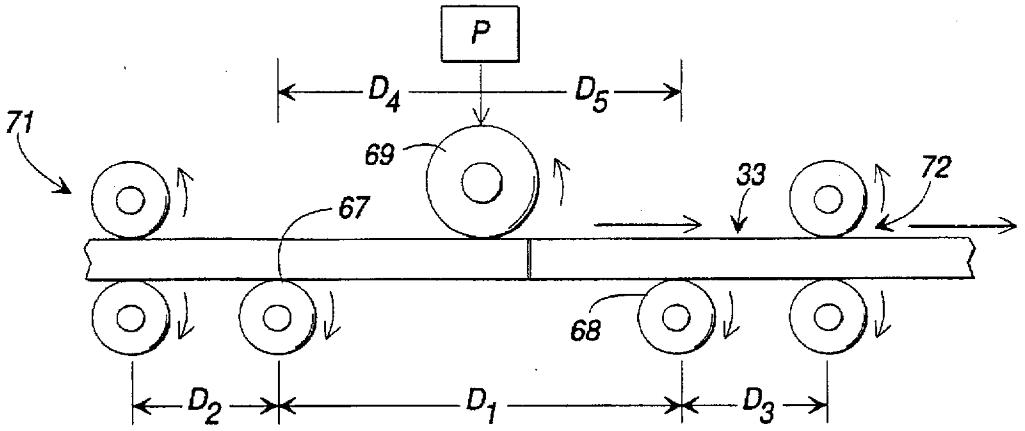
FIG. 5 is a functional diagrammatic illustration of a preferred method of proof loading each composite plank along its entire length to assure that it meets preestablished acceptance criteria.

FIG. 5 illustrates a preferred method of proof loading the composite trailer length floor planks along their entire lengths to ensure that the planks meet preestablished strength standards. In general, the proof loading device comprises a pair of spaced support rollers 67 and 68 across which the composite trailer length planks 33 are progressively moved. A pressure roller 69 is situated at a position between the spaced support roller 68 and is adapted to be applied to the composite trailer length planks with a predetermined transverse pressure as the planks move through the proof loader. A first pair of feed rollers 71 and a second pair of feed rollers 72 are positioned outboard of the support rollers 67 and 68. The feed rollers 71 and 72 are clamped against the planks 33 with pressure as they move through the machine. This accomplishes two things. First, at least one of the feed rollers is driven, which pulls the composite trailer length planks through the proof loading apparatus. In addition, the feed rollers 71 and 72 fix the planks vertically at locations outboard of the support rollers 67 and 68. This system of rollers flexes the plank dynamically as it proceeds through the proof loader, stressing each plank along its entire length as a center loaded beam restrained at both ends. The plank is deemed to have adequate bending strength if, under a given load, it does not deflect more than a predetermined amount for its width and thickness. The proof loader detects and rejects both defective finger joints and unusually weak planks. Furthermore, since the trailer length plank moves completely through the proof loader from one end to the other, virtually every linear foot of each of the trailer length plank is subjected to the proof loading test. Thus, the planks are tested along their entire length for weaknesses both in joints and in the wood itself before the planks are approved for use in decking platform trailers.

Relative spacings of the rollers can determine the rigorousness of the proof loading test. It has been found that the following spacings provide a test that adequately proof loads each plank along its entire length and assures that each plank meets the loading standards established by the Truck Trailer Manufacturers Association (TTMA).

$D_1$=5'0"

$D_2$=1'9"

$D_3$=1'9"

$D_4$=2'6"

$D_5$=2'6"

With these dimensions, the following equations are used to determine the load to be applied and the allowable deflection to reject point for various size planks during the test.

$F_{PL}$=Proofload Bending Stress>1.5 $F_{bxx}$ (psi) where: $F_{bxx}$=2150 psi

S=Section Modulus=$bd^2/6$ ($in^3$), where b is width and d is thickness

I=Moment of Inertia=$bd^3/12$ ($in^4$)

l=span (inches)

m=maximum bending moment (beam fixed at both ends, center-loaded)=P ⅛ (in-lbs) and m=P ⅛=$F_{PL}S$ (in-lbs)

P=Proofload Force=8 m/l=8 ($F_{PL}S$)/l (lbs)

E=Modulus of Elasticity for the type of wood being tested

D=Deflection=$Pl^3/192EI$ for a beam fixed at both ends and center loaded $D^1$=Maximum allowable deflection=$Pl^3/192(0.56E)I$ $(inches)^3$ The just described process of fabricating trailer length platform truck flooring has been found to result in a composite truck flooring plank of full trailer length that is highly superior to butt end boards, aluminum flooring, laminated flooring and even finger jointed planks of the prior art. Specifically, each of the planks is pretested to assure that it will support the loads applied to it on a platform trailer and to ensure that its finger joints are sufficiently strong and will not delaminate over time. The finger joints themselves extend vertically with respect to the trailer so that length ways flexing of the trailer does not affect the very narrow joint. In contrast, the trailer length longitudinal glue joints found in prior art laminated trailer flooring will delaminate on platform trailers due to the flexing of these trailers.

The use of finger jointed trailer length flooring produced by the method of this invention eliminates the butt ends that have so often been the achilles heel of platform trailer flooring in the past. Also, the use of twelve or thirteen trailer length planks as opposed to sixty or seventy butt end boards makes the flooring process for the trailer much simpler and quicker for the trailer manufacturer or trailer owner replacing the floor boards. Since internal ends are eliminated, the problems associated with the splitting and separation of these ends from their screws is also eliminated. Finally, the fact that the flooring runs continuously from the front to the rear end of the trailer provides dynamic strength to the entire trailer.

The invention has been described herein in terms of preferred embodiments and methodologies. It will be obvious to those of skill in this art, however, that numerous modifications might be made to the illustrated embodiments within the scope of the invention. For example, a particular factory floor layout has been illustrated for performing the invention. Clearly, other layouts might be used and the steps of the process might be performed in some cases in different order than presented in the preferred embodiment. Also, Keruing has been presented as the preferred lumber for use with the present invention. Clearly, other types of suitable lumber might be substituted for Keruing with similar results. Finally, in the proof loading step of the invention, the pressure roller has been shown as exerting transverse pressure downwardly on the boards as they move through the proof loading station. This process could obviously be reversed with the support rollers on the top and the pressure roller exerting pressure from the bottom. These and many other modifications, additions, and deletions might well be made to the embodiments illustrated herein without departing from the spirit and scope of the invention as set forth in the claims.

I claim:

1. A method of fabricating trailer length platform trailer flooring from wooden blanks of varying lengths, said method comprising the steps of:

a) selecting lumber having a predetermined width and thickness and exhibiting preestablished strength and durability characteristics;

b) inspecting each piece of selected lumber for the presence of unacceptable defects and cutting out portions of the lumber displaying such defects to produce defect free blanks of varying lengths, each of the blanks having a leading end and a trailing end;

c) successively aligning the defect free blanks in a spaced end-to-end relationship with the trailing end of one blank facing the leading end of a next successive blank;

d) machining the facing ends of the aligned blanks to form transversely extending mutually interlockable fingers;

e) applying adhesive to the fingers on the end of at least one of said blanks;

f) pressing the ends of the aligned blanks together with a predetermined force to interlock the fingers and thus join the blanks together at their ends to form an extended length composite plank;

g) repeating steps (d) through (f) with the aligned ends of successive blanks until the resulting composite plank has at least a predetermined standard length;

h) cutting the composite plank to the predetermined standard length;

i) curing the composite plank within a curing chamber at a predetermined temperature for a predetermined time to set the adhesive;

j) continuously moving the composite plank lengthwise through a proof loading mechanism and exerting a constant test load on the composite plank substantially along its entire length as the composite blank moves through the proof loading mechanism to insure that the plank meets preestablished strength standards;

k) milling the composite plank to a predetermined exterior profile; and l) combining the composite plank with like composite planks in an ordered series to form a kit containing a sufficient quantity of said composite planks to floor a platform track trailer.

2. A method of fabricating trailer length platform trailer flooring as claimed in claim 1 and where in step (f) said predetermined force comprises a force of at least twenty-thousand pounds.

3. A method of fabricating trailer length platform trailer flooring as claimed in claim 1 and where in step (i) said predetermined temperature is in the temperature range of from about seventy degrees Fahrenheit to about eighty degrees Fahrenheit.

4. A method of fabricating trailer length platform trailer flooring as claimed in claim 1 and wherein step (j) comprises the steps of moving the composite plank across spaced support rollers while simultaneously applying a predetermined transverse pressure to the composite plank at a location intermediate the support rollers, measuring the deflection of the composite plank as a result of the application of said transverse pressure, and determining whether the composite plank meets a preestablished acceptance criteria based on the measured deflection.

5. A process for fabricating finger jointed trailer length platform trailer flooring from wooden blanks used to floor a trailer, said process comprising the steps of joining at least two of the wooden blanks together at their ends to form an extended length composite plank, cutting the composite plank to a desired predetermined length, moving the composite plank in the lengthwise direction through a proof loader mechanism and subjecting the composite plank to a constant test load substantially along the entire length of the composite blank as it is advanced through the proof loader mechanism, determining whether the composite plank meets preestablished strength criteria based upon the response of the composite blank to the application of the test load thereon, milling the composite plank along its length to form a predetermined exterior profile of the plank, and combining the milled composite plank with like composite planks in an ordered series of composite planks and forming a kit containing a sufficient quantity of composite planks required to floor the platform trailer.

6. A process for fabricating finger jointed trailer length platform trailer flooring from wooden blanks as claimed in claim 5 and wherein the step of joining at least two of the wooden blanks together at their ends comprises the steps of machining the ends of the blanks to form matable profiles, applying adhesive to the machined ends, and pressing the ends of the blanks together with a predetermined pressure.

7. A process for fabricating finger jointed trailer length platform trailer flooring from wooden blanks as claimed in claim 6 and wherein the step of machining the ends of the blanks to form matable profiles comprises the step of cutting the ends of the blanks to form a plurality of transversely extending vertically oriented fingers thereon with the fingers of one end being interlockable with the fingers of the other end.

8. A process for fabricating finger jointed trailer length platform trailer flooring from wooden blanks as claimed in claim 5 and wherein the step of subjecting the composite plank to a constant test load along the length of the composite plank comprises the steps of continuously moving the composite plank across a pair of spaced support rollers and applying a predetermined lateral force to the moving plank at a location intermediate the support rollers.

9. A process for fabricating finger jointed trailer length platform trailer flooring from wooden blanks as claimed in claim 8 and wherein the step of determining whether the composite plank meets preestablished strength criteria comprises the steps of measuring the deflection imparted to the moving plank at said location as a result of the applied lateral force and comparing the measured deflection to a predetermined maximum acceptable deflection.

10. A process for fabricating finger jointed trailer length platform trailer flooring from wooden blanks as claimed in claim 8 and wherein the moving composite plank also passes between two pairs of feed rollers located outboard of said spaced support rollers to simulate application of load where the composite plank is restrained at both ends.

11. A method of fabricating trailer length floor planks for use in flooring platform track trailers, said method comprising the steps of:

a) providing a plurality of wooden blanks having appropriate characteristics for use as trailer floor planks;

b) successively joining the wooden blanks together at their ends to form a composite plank of progressively extending length;

c) detecting when the progressively extending composite plank exceeds a predetermined length and cutting the composite plank to the predetermined length;

d) repeating step (c) to produce successive composite planks of predetermined lengths;

e) continuously moving each successive one of the composite planks lengthwise through a proof loading mechanism and laterally exerting a constant test load on each of the composite planks substantially along its entire length as the composite blanks are moved through the proof loading mechanism to determine whether the composite planks meet predetermined acceptance criteria; and f) milling the acceptable composite planks to have a predetermined exterior profiles appropriate for flooring a platform trailer.

12. A method of fabricating trailer length floor planks as claimed in claim 11 and where in step (a) the lumber used is Keruing.

13. A method of fabricating trailer length floor planks as claimed in claim 11 and wherein step (b) comprises finger jointing the ends of the wooden blanks, applying adhesive to the finger jointed ends, and pressing the ends together with a predetermined force to join the timbers together end-to-end with transverse vertically extending finger joints.

14. A method of fabricating trailer length floor planks as claimed in claim 11 and wherein step (e) comprises the steps of moving the composite planks lengthwise across a pair of spaced support rollers, applying a predetermined lateral test force to the moving planks at a location between the spaced support rollers, detecting the deflection of the planks as a result of the force, and measuring the deflection of each said composite plank to determine whether the planks meet a predetermined acceptance criteria based on the measured deflection.

15. A method of fabricating trailer length floor planks as claimed in claim 14 and further comprising the step of providing two pairs of spaced feed rollers located outboard of the spaced support rollers and positioned so that the moving composite planks pass between the feed rollers of each said pair of feed rollers to secure the planks against deflection outside of the region between the support rollers.

16. A method of fabricating trailer length floor planks for use in flooring platform truck trailers, said method comprising the steps of:

a) providing a plurality of wooden blanks having appropriate characteristics for use as trailer floor planks;

b) successively joining the wooden blanks together at their ends to form a composite plank of progressively extending length;

c) detecting when the progressively extending composite plank exceeds a predetermined length and cutting the composite plank to the predetermined length;

d) repeating step (c) to produce successive composite planks of predetermined lengths;

e) forming a lengthwise stack of the composite planks by successively forming a first predetermined number of the composite planks into a lengthwise tier of said composite planks, and then stacking a plurality of said tiers of composite planks to form said lengthwise stack of composite planks by spacing each respective one of said tiers from each adjacent one of said plurality of tiers by placing at least a spaced pair of chemically treated spacers between adjacent ones of said plurality of tiers; and g) moving said stack of composite members through a curing chamber having a predetermined humidity and a predetermined temperature for a preestablished length of time and curing the adhesive applied to the finger joints in response thereto.

17. The method of claim 16, further comprising the step of proof loading each respective one of the composite planks substantially along its entire length by applying a constant lateral test load with a proof loader mechanism to the length of each said composite plank as each respective composite plank is sequentially and continuously moved through said proof loader mechanism, and determining whether each respective composite plank satisfies predetermined acceptance criteria in response thereto.

18. The process of claim 16, further comprising the step of milling the acceptable composite planks to have a predetermined exterior profile appropriate for flooring a platform trailer.

19. The process of claim 16, subsequent to step (i), further comprising the step of combining a second predetermined number of the composite planks in an ordered series of composite planks and forming a kit containing a sufficient quantity of said composite planks to floor a platform truck trailer.

* * * * *